May 6, 1930.   H. QUIGGIN ET AL   1,757,814
CONTAINER
Filed Aug. 17, 1927
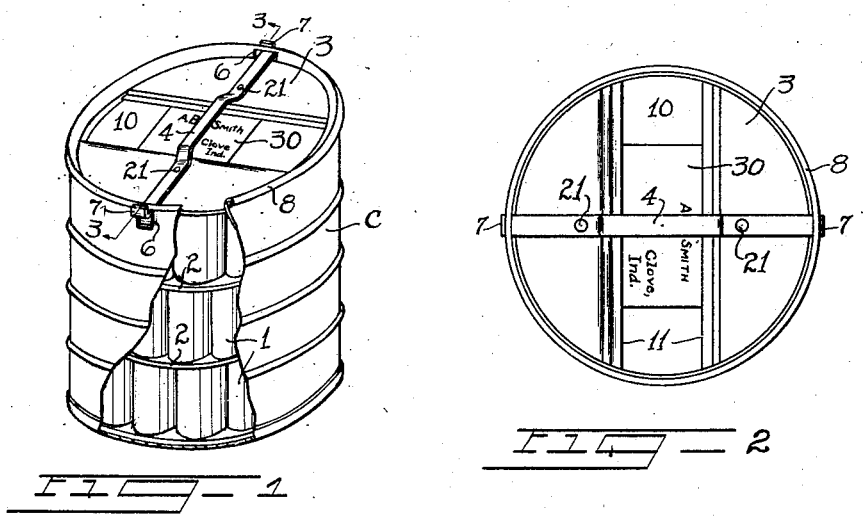
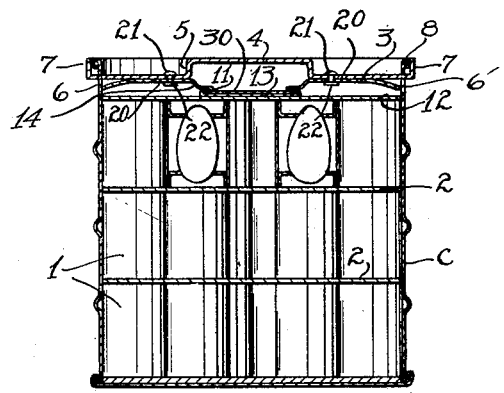
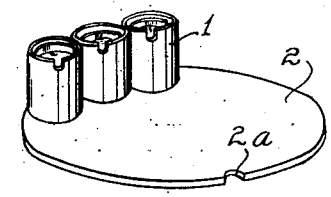
Inventor
Harry Quiggin & Jack Hood
By Bates, Macklin, Bolrick & Teare
Attorneys Patented May 6, 1930

1,757,814

UNITED STATES PATENT OFFICE

HARRY QUIGGIN AND JACK WOOD, OF CLEVELAND, OHIO, ASSIGNORS TO CHARLES HENRY McKEON, OF CLEVELAND, OHIO

CONTAINER

Application filed August 17, 1927. Serial No. 213,608.

This invention relates to egg carrier containers and more particularly to a container structure and the means for spacing and holding the eggs in the container.

It is often desired to deliver eggs in quantities suitable for household consumption through the mail or by express, and it is among the objects of our invention to provide a device for shipping the eggs which will facilitate the shipment and will protect the eggs from breaking.

Other objects include forming a container so that it can be readily stacked in the other containers. A further object is to provide a handle or grip so that the container can be carried from place to place. Another object is to provide a readily detachable closure for the container. Other objects include means for securely packing the eggs in the container so that they will not be broken by contact with each other or with the container.

In the drawings Fig. 1 is a partially broken perspective view of the container; Fig. 2 is a plan view of the closure member and the handle associated therewith; Fig. 3 is a section taken along the line 3—3 of Fig. 1; Fig. 4 is a perspective drawing of a shelf with individual carriers associated thereto.

In carrying out the objects of our invention we have employed an individual egg carrier 1, which may be similar to that shown in U. S. Patent No. 1,134,445 issued to Flesher in April 1915. Briefly, these containers are made of cardboard or similar material and may be cylindrical and have flanged disks located in opposite ends between which an egg may be gently but firmly positioned. Our invention relates to carrying, handling and enclosing a plurality of such or similar carriers and we show in Figs. 1 to 4 that we provide layers of such carriers, one layer placed above another.

Referring particularly to Fig. 1, we show a container C which may be cylindrical in form although we do not care to be limited to the cylindrical shape inasmuch as a rectangular or square container otherwise constructed according to the precepts of our invention would suffice. As mentioned above, the carriers 1 are arranged in layers and disposed within the container. We take the carriers 1 and place them upon or secure a number of them to shelves 2 (see Fig. 4) so that each layer may be removed from the container as a group. The shelf 2 may be made of cardboard or corrugated board or similar suitable material and may be notched as at 2ª. Each carrier has an egg placed within it and each group or layer of carriers is in turn placed in the container C. The size of the container may be such as to hold two to five layers more or less according to the needs of the particular customer. We have found for instance, that about a dozen and a half carriers may be placed in each layer carried by each of the shelves 2.

Referring particularly to Figs. 1 and 3, we provide a removable closure member for the container comprising a metal disk 3 with which is associated a handle and locking member 4. In the upper walls of the container we provide rectangular openings 6 through which the ends of the handle 4 may pass, so that the closure member is held securely. The brim of the container may be suitably beaded for strength as at 8.

Referring to Figs. 2 and 3, we show the closure member 3 being formed with a laterally extending channel 10 having inclined sides. This member may be made of sheet metal and may be folded as shown in Fig. 3 so that on opposite sides of the channel 10 are provided oppositely facing grooves 11 which extend the length of the channel across the member 3. An address card 30 may be slid in these grooves and retained in place by reason of the edge of closure member being positioned below the brim of the container. The bottom of the channel 10 is depressed below the general horizontal plane of the member 3. The bottom of the channel contacts as at 13 with the upper removable shelf 12 which lays across the tops of the carriers 1. The side walls of the channel are inclined as at 14 so that yielding and resilient contact may be had between the closure member and the several carriers of the container.

The handle and locking member 4 extend across the face of the member 3 and may have an upwardly extending bridge portion as at 100

5 disposed over the channel 10 of the closure member so that the handle may be readily grasped. The top of the bridge lies flush with the bead 8. The portions of the handle member 4 may lie along the flat portions of the closure member and the extreme ends of the handle may be upturned as at 7. The closure member 3 has slotted openings as at 20 (see also Fig. 2). Rivets or pins 21 having enlarged heads 22 are fixed to the handle and extend through the slots 20. To fix the closure member in position, the handle may be slid so that one of the ends 7 is approximately flush with one edge of the closure member 3 and the other end extends well beyond the opposite edge. This end is passed through one of the openings 6 in the upper wall of the container C and then the closure member is laid down flat against the top of the removable shelf 12 and is urged forcibly downwardly against the mass of the carriers within, until the other opening 6 is exposed and then the handle is slid so that both the ends 7 extend through the openings and the upturned ends engage the outer side of the bead 8. Meanwhile the inclined sides of the channel 10 resiliently urge the closure member upwardly so that the ends of the handle are held in position and on the other hand, the several carriers within the container are held closely packed.

We have here described the preferred form of our invention certain modifications of which may appear to one skilled in the art. We do not care to be limited in the scope of our invention other than by the claims appended hereto.

We claim:

1. The combination of a metal container having an open top and having a pair of diametrically opposed openings adjacent the brim thereof, a closure member adapted to fit within the open top of the container and having a pair of diametrically aligned slots therein and a handle carrying pins passing through said slots, said handle being in slidable engagement with said closure member and adapted to extend through the openings adjacent the brim of the container.

2. In combination, a cylindrical metal container having an open end, a plurality of smaller cylindrical members adapted to be packed in layers within said container, a disc-like closure member for the open end of said container adapted to be positioned below the brim thereof, said disc-like member having a depressed portion resting upon the uppermost layer of said smaller members, said container having a pair of diametrically opposite openings adjacent the brim thereof and a handle member engaging said disc-like member at points beyond the said depression and extending through said openings whereby said small members are resiliently packed in the container.

3. The combination of a cylindrical container, articles packed in the container to a depth slightly below the brim thereof, a disc-like member forming a closure for said container and adapted to be disposed below the brim thereof, and resting upon said articles, said disc-like member having a laterally extending depressed channel formed therein and contacting with said articles and means in slidable engagement with said disc-like member engaging the body of the container and contacting with said disc-like member at points beyond the said depression.

4. The combination of a cylindrical container having articles packed therein to a depth slightly below the brim thereof, a disc-like member forming a closure for said container and adapted to be disposed below the brim thereof, and resting upon said articles, said disc-like member having a laterally extending depressed channel formed therein and means including a bar in slidable engagement with said disc-like member engaging the body of the container and contacting with said disc-like member at points beyond the said depression and having a raised bridge portion disposed over said depression.

5. The combination of a container adapted to be filled to a point below the brim thereof, a closure member for the container having a pair of diametrically aligned slots, and a member carrying pins having enlarged heads and passing through said slots and slidably engaging said closure member and extending beyond the edges thereof, said container having a pair of diametrically opposed openings near the brim thereof adapted to receive the ends of said last named member.

6. The combination of a container having an open end, a closure member therefor, said closure member being adapted to be disposed below the brim of said container, said closure member having a depressed channel extending across its face, said depressed channel portion being formed to have oppositely facing grooves in the side thereof for slidably engaging the edge of a card or similar device, and a handle member having a raised bridge portion spanning said channel and being secured to said closure member.

7. In an egg container, the combination of a resilient closure member and a handle for the container, said closure member fitting within and below the brim of the container and having a depressed portion engaging the contents of the container and a raised planular portion slidably engaged by said handle at points spaced from the depressed portion, said container having openings adjacent the brim thereof for receiving opposite end of the handle.

In testimony whereof, we hereunto affix our signatures.

JACK WOOD.
HARRY QUIGGIN.